United States Patent [19]
Hilal et al.

[11] Patent Number: 5,144,179
[45] Date of Patent: Sep. 1, 1992

[54] SUPERCONDUCTING BRUSHLESS HOMOPOLAR MOTOR WITH MULTIPLE WINDING ROTOR

[75] Inventors: Mohamed A. Hilal, Madison, Wis.; Jerry D. Lloyd; Alan D. Crapo, both of St. Louis, Mo.

[73] Assignee: Emerson Electric Co., St. Louis, Mo.

[21] Appl. No.: 679,747

[22] Filed: Apr. 3, 1991

[51] Int. Cl.$^5$ ............................................. H02K 31/00
[52] U.S. Cl. ............................................. 310/178; 310/261; 310/166
[58] Field of Search ............... 310/178, 261, 219, 166, 310/168, 208, 66, 68 D

[56] References Cited
U.S. PATENT DOCUMENTS

| | | | |
|---|---|---|---|
| 4,105,963 | 8/1978 | Dobranic | 310/178 |
| 4,499,392 | 2/1985 | Giacoletto | 310/178 |
| 4,602,179 | 7/1986 | Kuznetsov et al. | 310/178 |
| 4,710,660 | 12/1987 | McKee et al. | 310/178 |
| 4,754,687 | 6/1988 | Kemeny | 89/8 |

*Primary Examiner*—Steven L. Stephan
*Assistant Examiner*—Matthew Nguyen
*Attorney, Agent, or Firm*—Polster, Lieder Woodruff & Lucchesi

[57] ABSTRACT

A brushless homopolar dynamoelectric machine motor (1) has a rotor (3) with a least one winding (5) having multiple turns. The rotor is inductively charged using a flux pump or a rectifier. Solenoid pairs (15a, 15b, 17a, 17b) comprise field windings for the motor and compensate for winding and field losses. The motor is an axisymmetric motor in which superconductive materials are used.

10 Claims, 5 Drawing Sheets

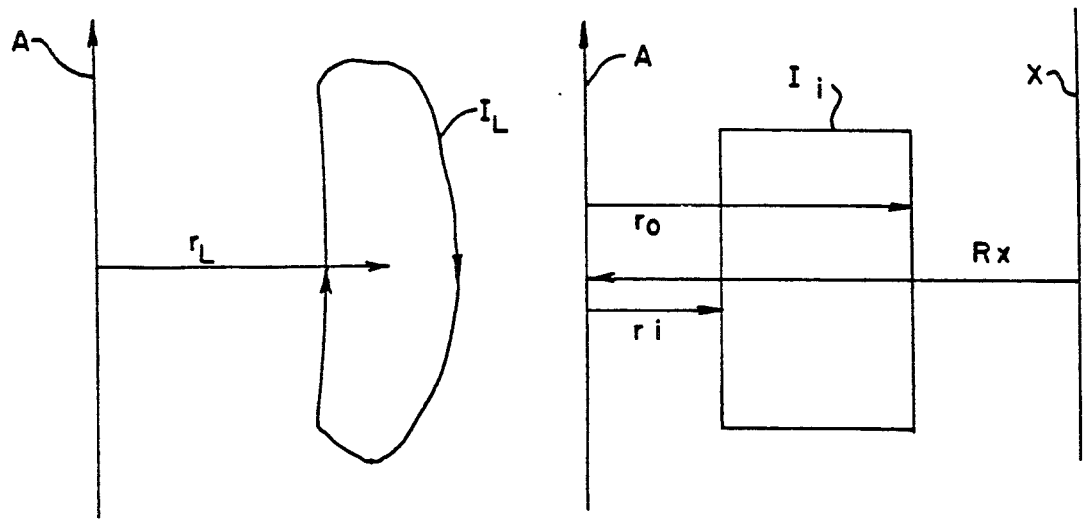
A CURRENT LOOP IN AN AXIS SYMMETRIC FIELD
FIG.1.
RECTANGULAR CURRENT LOOP
FIG.2.
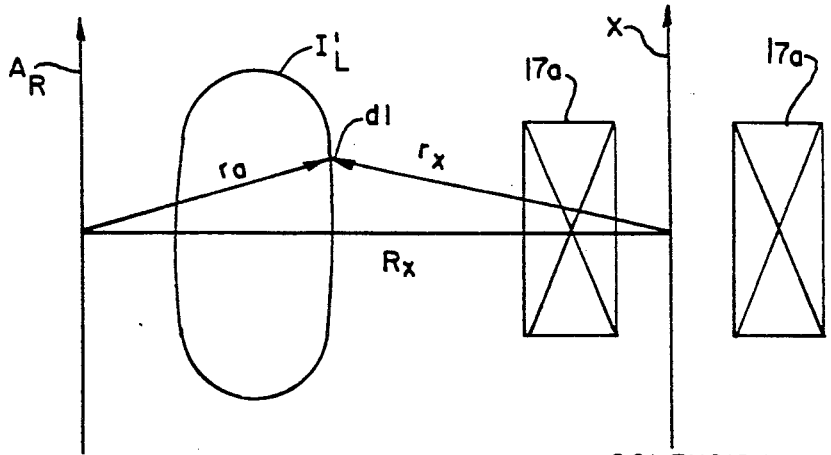
FIG.4.
SOLENOID WINDING
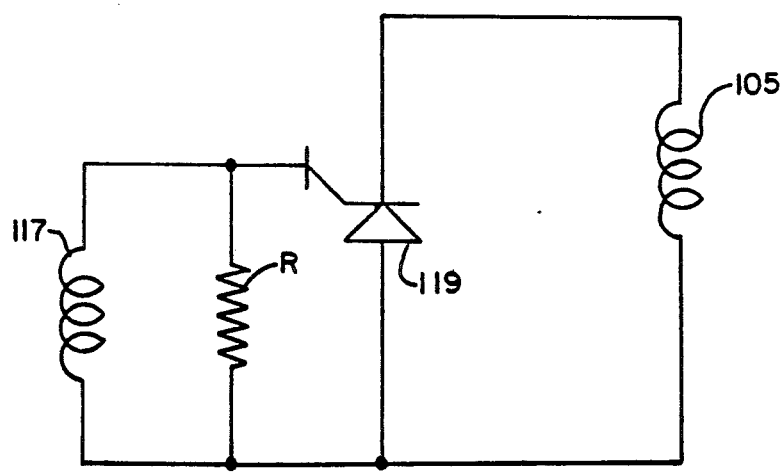
FIG.6.

SUPERCONDUCTING BRUSHLESS HOMOPOLAR MOTOR WITH MULTIPLE WINDING ROTOR

BACKGROUND OF THE INVENTION

This invention relates to dynamoelectric machines such as electric motors and generators and, more particularly, to brushless, multi-turn, homopolar (BMH) motors and generators.

A homopolar motor or generator is one in which the electrical field of the motor or generator is symmetrical about a particular axis. As a practical matter, such motors or generators are not widely used. One reason for this is because they operate at high currents and with low voltages. Since their operation involves use of brushes and slip rings, or other current collection systems, to supply current, losses due to the voltage across the brushes represents a major portion of the machines losses. Because machine losses are directly proportional to the current, this, in turn, greatly reduces the efficiency rating of the motor or generator. This rating could be significantly improved if, for example, it were possible to eliminate brushes from the machines.

SUMMARY OF THE INVENTION

Among the several objects of the present invention may be noted the provision of a multi-turn homopolar dynamoelectric machine such as a motor or generator; the provision of such a machine operating as a d.c. machine; the provision of such a machine having a simplified conductor design requiring no high resistivity matrix; the provision of such a machine which operates at low current and high voltage; the provision of such a machine which is a brushless machine and therefore has no brush losses; the provision of such a machine in which machine rotation is with respect to a different axis than that of conventional homopolar machines; the provision of such a machine to have a significantly increased efficiency rating over conventional homopolar machines; and, the provision of such a machine having field windings which are preferably of a superconductive material to further help improve machine efficiency.

The invention briefly stated, is to a dynamoelectric machine comprising a rotor having at least one winding including a number of turns. The rotor is inductively charged using a flux pump. A switch is used to control operation of the flux pump.

Other objects and features will be in part apparent and in part pointed out hereinafter.

BRIEF DESCRIPTION OF THE DRAWINGS

FIG. 1 is a representation of a current loop in an axisymmetric filed,

FIG. 2 is a representation of a rectangular current loop in the field;

FIG. 4 is a representation of a current loop for the embodiment shown in FIG. 3;

FIG. 6 is a schematic of a control circuit for use with the embodiment of FIG. 5;

Corresponding reference characters represent corresponding parts throughout the drawings.

DESCRIPTION OF PREFERRED EMBODIMENTS

Figure 3:
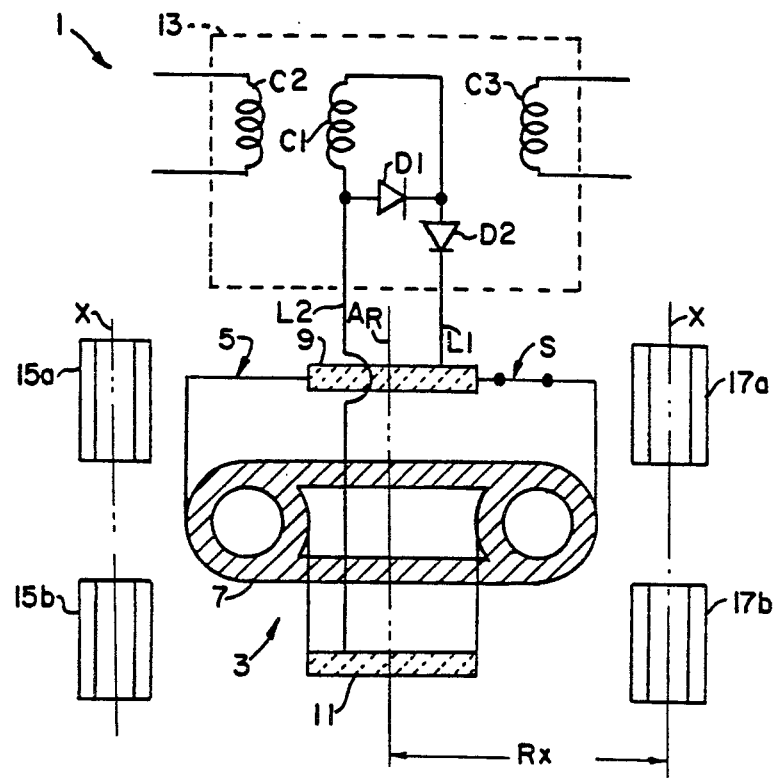
FIG. 3 is a schematic representation of a first embodiment of the invention.

Referring to the drawings, a dynamoelectric machine of the present invention is designated 1 in FIG. 3. Machine 1 is, for example, a brushless homopolar (BMH) motor. The term homopolar is defined as meaning electrically symmetrical about an axis. Operation of previous BMH type motors is understood with reference to FIG. 1. As shown in FIG. 1, a current loop $I_L$ is placed in an axisymmetric field a distance $r_1$ from an axis A. For purposes of analysis, loop $I_L$ can be approximated by the rectangular loop Ii shown in FIG. 2. This loop has an inner radius $r_i$ and an outer radius $r_o$. It can be mathematically proven that for a loop $I_i$, the torque produced by the loop is zero; even though the force is not zero. This means that for practical purposes, a brushless homopolar motor of a conventional design is not useful since it generates zero torque with respect to the axis of symmetry. If, however, a BMH motor could be made in which the axis of motor rotation is different than the axis of magnetic symmetry; for example, the axes X and A shown in FIG. 2, then such a homopolar motor would be feasible. As shown in FIG. 2, axis X is a distance $R_x$ from axis A.

Referring to FIG. 3, dynamoelectric machine 1 includes a rotor 3. The rotor has a multiple turn winding 5 whose turns are wrapped about a drum or toroid 7. A first distribution disk 9 is located on one side of the drum and a second distribution disk 11 is located on the opposite side thereof. A half-wave rectifier circuit 13 comprises a coil C1 on which a.c. current is impressed by coils C2 and C3 during respective half-cycles of a.c. current flow. Diodes D1 and D2 are included in the rectifier circuit for providing the half-wave rectification necessary to produce the d.c. voltage applied to the winding. The diodes are connected to coil C1, diode D1 being connected across the coil and therefore across electrical leads L1 and L2. Diode D2 is series connected in lead L1 which, in turn, is connected to distribution disk 9. The other lead, lead L2 is connected to the other distribution disk 11. An electrical switch S is located in the rotor winding and when closed, as shown in FIG. 3, allows the d.c. current to flow through the winding.

Also shown in FIG. 3 are solenoids 15a, 15b, 17a and 17b which comprise field windings. The solenoids 15a and 15b form one solenoid pair and solenoids 17a and 17b a second pair. It will be understood there may be more than two such pairs. The solenoids comprising each pair are on opposite sides of drum 7. The solenoids are symmetrical about the axis X and spaced the radial distance $R_x$ from axis A. Current flow through the solenoid winding induces a current in the rotor winding to produce torque. Input power to the field windings compensates for winding and lead losses in the motor. Consequently, no power is supplied to the motor through the solenoid coils. Also, the coils are not subject to an a.c. field during steady state operation of the machine. As a consequence, the coils of the solenoid are preferably of a superconductive material.

The homopolar motor of FIG. 3 is designed for rotation with respect to axis $A_R$. One or more pairs of solenoids (two pairs are shown) are arranged so that the axis (X) of symmetry of each solenoid pair is different than the axis of rotation ($A_R$). As discussed with respect to FIG. 2, the rotation about this axis rather than axis A makes a motor or generator arrangement such as shown in FIG. 3 feasible. Referring to FIG. 4, the radial distance between the two axes is $R_x$. A current loop $I_L$ is shown positioned between these axes with the distance from axis $A_R$ to any point on the loop being $r_a$ and the distance from the other axis to that same point $r_x$. It can be mathematically shown that a uniform current flow over the drum's surface will produce zero torque. Thus, the force on a segment dl of loop length is given by the equation $$dF = Idl \times B$$

where F is force, I is current, dl is the vector representation of the segment, and B is magnetic flux density. The torque is given by the equation $$dT = Ir_a \times (dl \times B)$$

where T is torque and r is the distance from axis A to the location of loop segment dl. The distance $r_a$ can be expressed as vector such that $$R_A = R_x + R_x$$

Substituting, the torque equation becomes $$dT = r_x \times (dl \times B) + I R_x \times (dl \times B)$$

Integrating the above equation along the loop path yields $$T = I r_x(dl \times B) + I R_x \times (dl \times B)$$

It can further be mathematically shown that $$I r_x \times (dl \times B)$$

is an exact differential and is equal to zero. The second portion of the equation represents the total force on current loop $I_L$ due to the field created by a solenoid or field winding such as winding 17a. It can also be mathematically shown that this force is equal to zero.

Application of a constant voltage on winding 5 results in a non-uniform current distribution. Current will be higher in the negative emf region because it opposes any external voltage applied to the motor, and lower in the positive emf region because it complements the external voltage. With respect to the equation for torque set forth above, the non-uniform current distribution results in the equation having non-zero integrands. If both the mechanical and electrical energy are dumped internally of the motor, it becomes entirely disruptive. Therefore, to obtain a proper motor action, switches such as the switch S are used.

Figure 5:
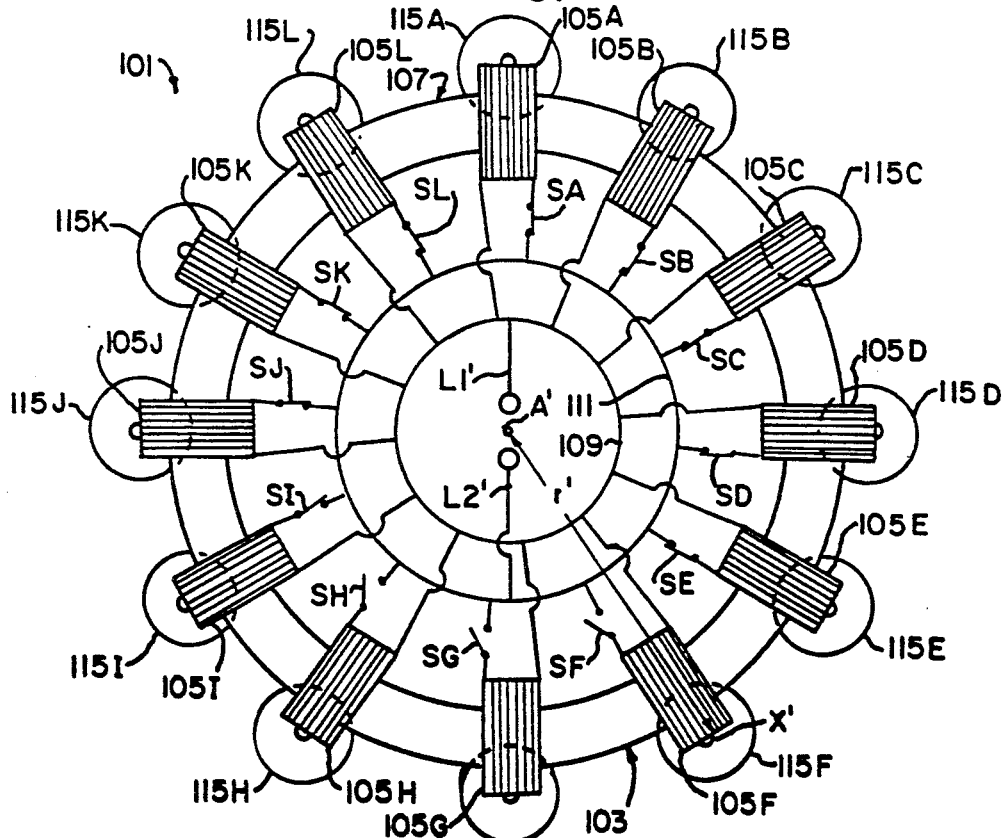
FIG. 5 is a schematic of a second embodiment of the invention.

Referring to FIG. 5, a second embodiment of a BMH motor is designated generally 101. A rotor 103 of the motor includes a drum 107 about which respective multi-turn windings 105A-105L are arranged. The sets of windings are connected in parallel and are equidistantly spaced about the drum. Thus, as shown in FIG. 5, each of the twelve sets of windings are spaced 30 electrical degrees apart. It will be understood that motor 101 may have more or fewer coils than the twelve coils shown. The distribution disks are represented by the respective distribution rings 109 and 111 with a lead L1' connecting one side of a half-wave rectifier circuit (not shown) to ring 109, and a lead L2' connecting the other side of the circuit to ring 111. A respective electrical switch SA-SL is interconnected in each winding set, the switches being connected in-line with the coil turns forming the winding.

The switches are closed when back emf is opposing the voltage applied to their associated winding. If the back emf is complementing the applied voltage, the switches, for example, switches SF-SH, are open. Referring to FIG. 6, the switches are effected by a small coil 117 which is wound about drum 107 over the top of each winding 105. The small coil is insulated from the winding. Each winding 105 is connected between the anode and cathode of a gate turn-off (GTO) thyristor 119. The operation of the gate of the thyristor is controlled by voltage developed by coil 117 and impressed on the thyristor's gate input across a resistance R.

The stator of motor 101 is comprised of a series of solenoid pairs 115A-115L. Only one solenoid in each pair is shown. These stator solenoidal coils are spaced a radial distance r' from an axis A'. As with the embodiment of FIG. 3, current flow through the respective winding pairs generates a magnetic field that induces currents in the rotor windings to produce motor torque.

Figure 7:
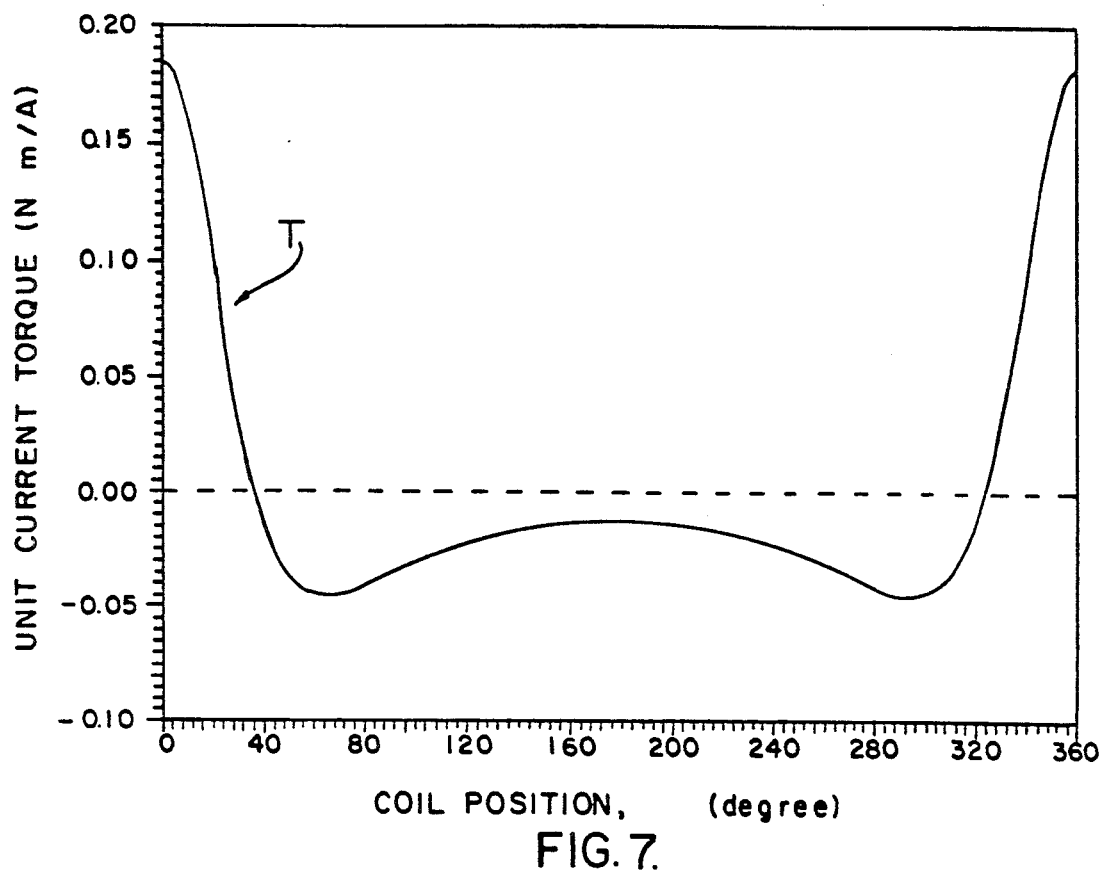
FIG. 7 is a representation of the torque of a rotor coil for the FIG. 5 embodiment.
Figure 8:
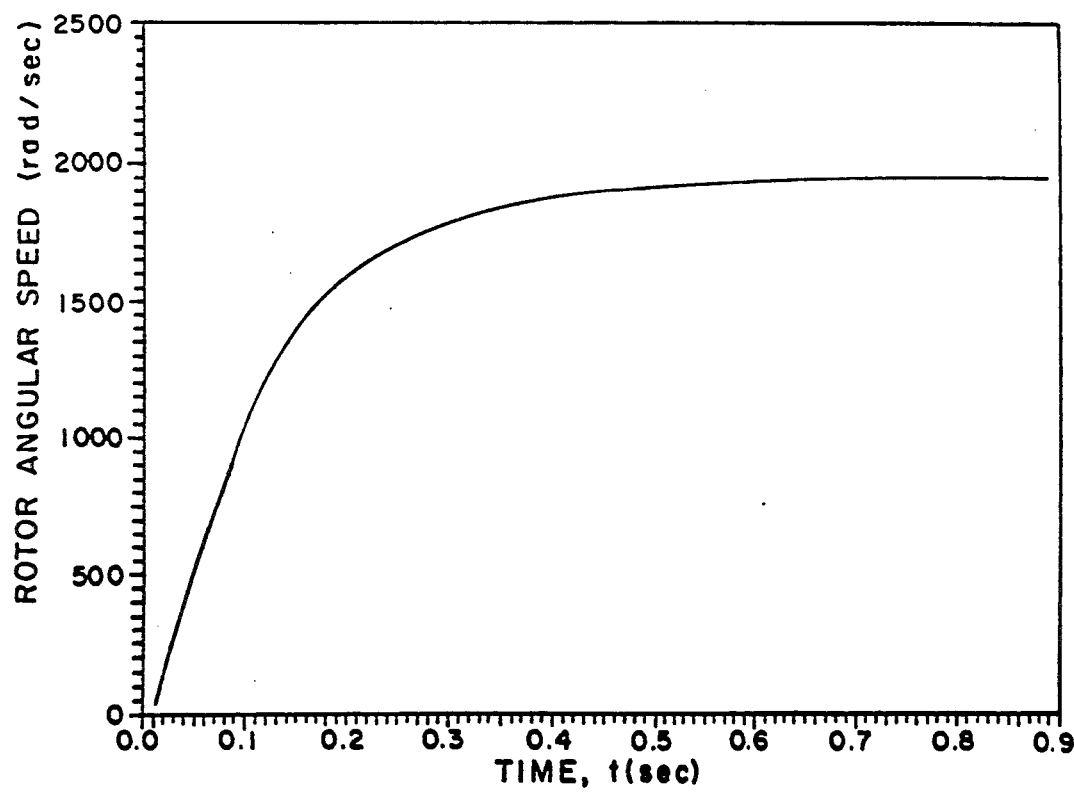
FIG. 8 is a representation of rotor speed over time for the embodiment.
Figure 9:
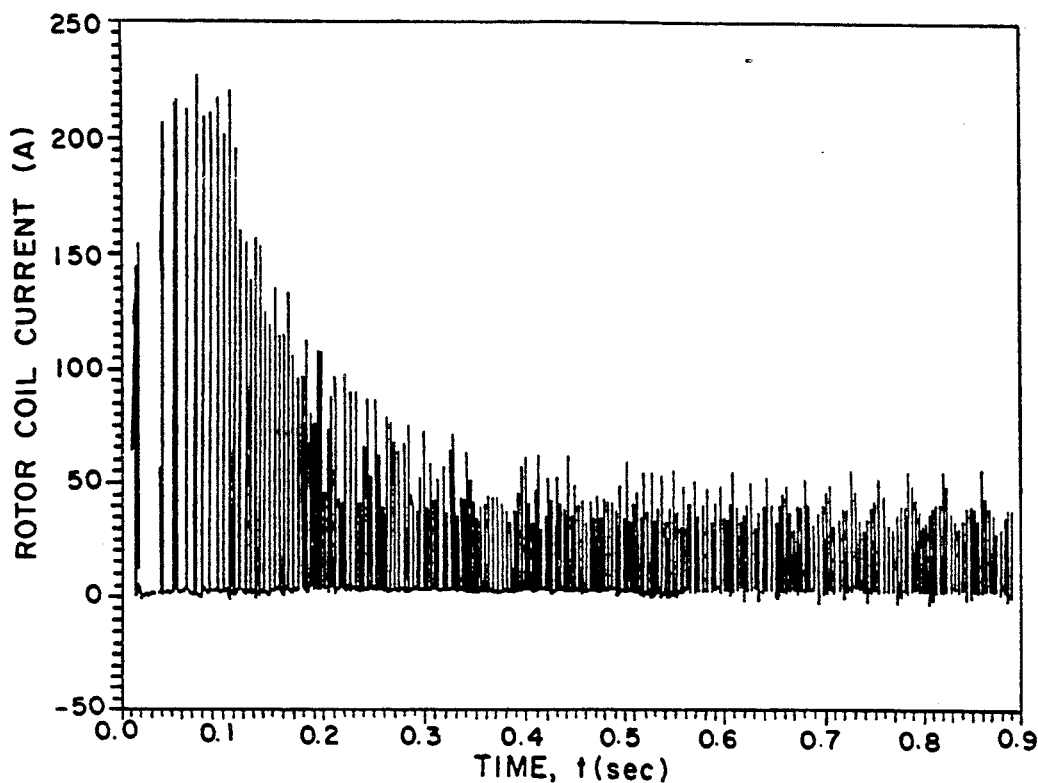
FIG. 9 is a representation of current flow in a rotor coil of the embodiment.
Figure 10:
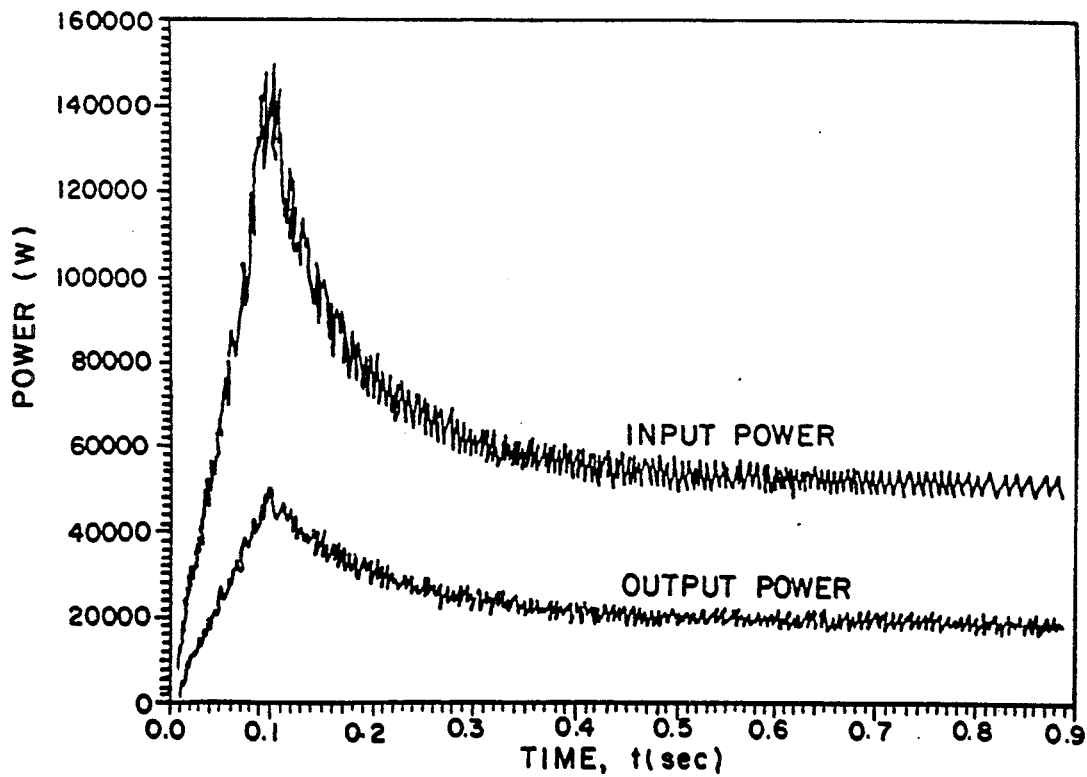
FIG. 10 is a representation of the motor's input and output power.

Referring to FIGS. 7-10, performance characteristics for the motor are shown. In FIG. 7, the torque T of a coil 105 is shown as a function of the unit current generated by a stator field. The torque varies in response to the coil position (in degrees) to the stator field. In FIG. 8, the angular speed of rotor 103 is shown as a function of time. From an initial rest position, the rotor rapidly accelerates so that it approaches a steady state angular speed in approximately 0.5 seconds. FIG. 9 illustrates current in one of the rotor coils. The current has an initial peak and then rapidly falls off to a steady state condition. Comparing FIGS. 8 and 9, the steady state current condition occurs within approximately the same time period, after motor start-up, as it takes for the rotor to achieve steady state angular rotation. Lastly, FIG. 10 shows motor input power and motor output power over time. For the values shown, motor efficiency is approximately 40%.

The dimensions of the rotor 103 and the stator for a brushless homopolar motor 101 are, for example, as follows:

| Stator | |
|---|---|
| Height | 10 cm (3.9 in.) |
| Radius of a solenoid | 6.5 cm (2.55 in.) |
| Distance between the mid-points of solenoids comprising a pair | 14 cm (5.5 in.) |
| Distance r' between axes A' and X' | 12 cm (4.7 in.) |
| Current per unit height | 2 MA/m |
| Maximum field | 2.5 Tesla |
| Rotor | |
| Radius from axis A' to mid-point of drum 107 | 4 cm (1.57 in.) |
| Diameter of drum | 2.3 cm (0.9 in.) |
| Number of coils 105 | 24 |
| Turns/coil | 100 |

| | |
|---|---|
| Moment of inertia | 0.004 kg · m² |
| Applied voltage | 300 v. |
| Resistance of switch S | 100 ohms |
| Coil resistance | 0.2 ohms |

Figure 11B:
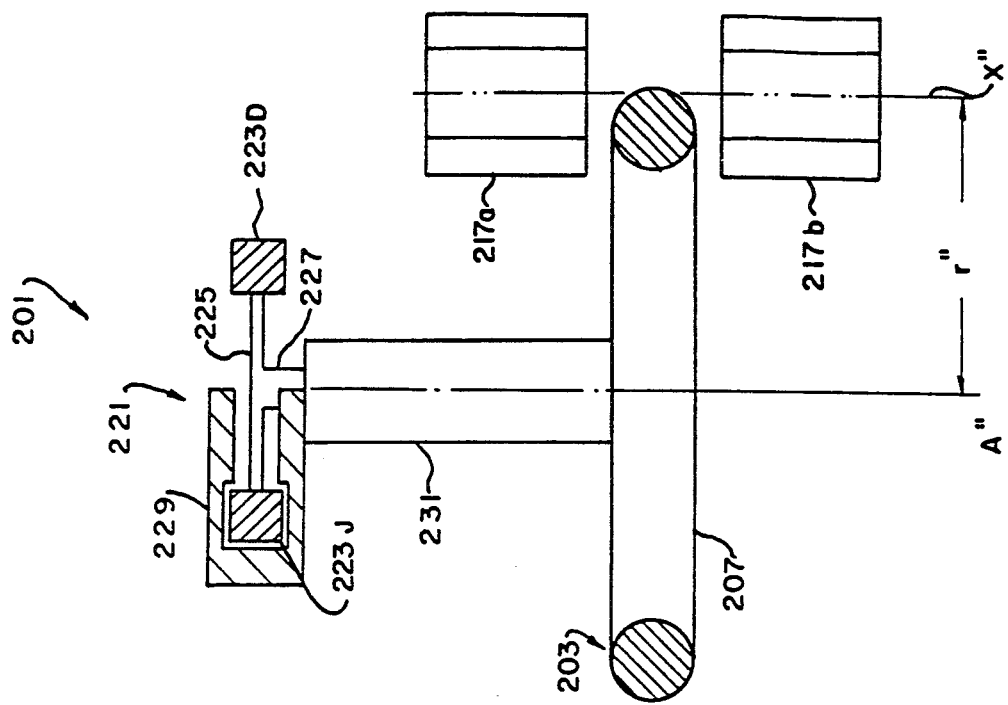
FIG. 11A is a plan view of a homopolar motor in which an inductor winding is used as a switch for flux pumping; and, FIG. 11B is a sectional view of the motor taken along line 11B—11B in FIG. 11A.
Figure 11A:
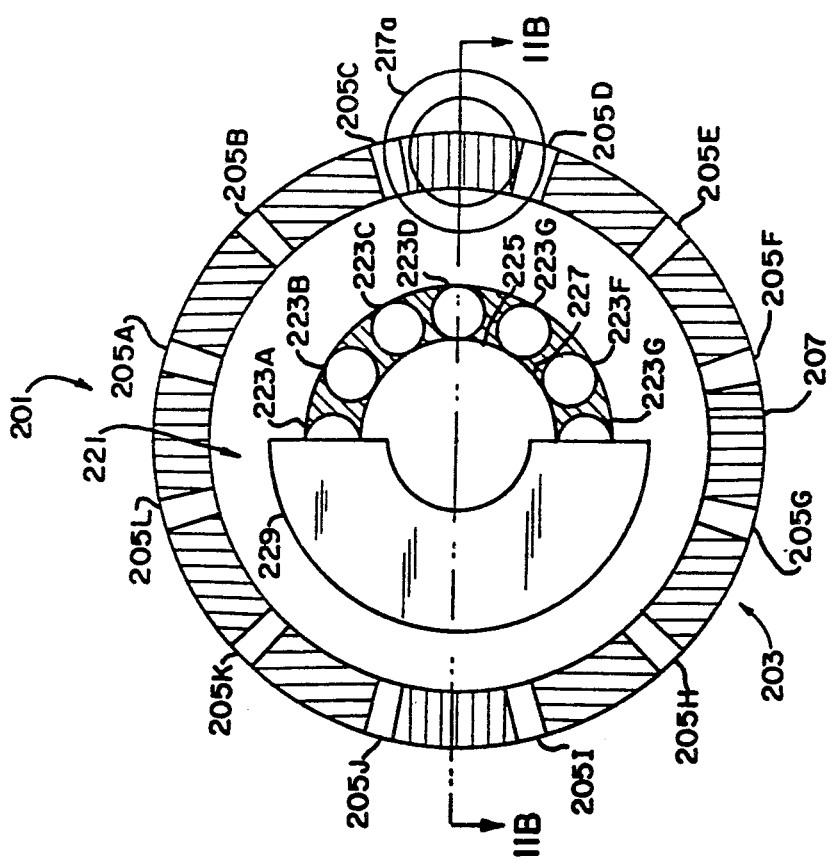

Referring to FIGS. 11A and 11B, another embodiment of the present invention includes a variable inductance switch operation BMH motor 201. Now, a rotor 203 includes a toroidal shaped drum 207 having a number of rotor winding 205A-205L wound thereon. A pair of solenoids 217a, 217b represent a series of such solenoidal pairs positioned about the rotor. The solenoids are oriented about the axis X″ which is radially spaced a distance r″ from motor axis A″. Now, the switching function previously described is accomplished using a variable inductance switch indicated generally 221. A plurality of solenoid inductors 223 are provided, one for each rotor winding (only solenoids 223A-223G are shown in FIG. 11A). The solenoids are mounted on a ring 225 attached to a one end of a rotor shaft 227. A half-ring housing 229, which is C-shaped in cross-section as shown in FIG. 11b, is attached to a post 231. As the rotor shaft turns, the solenoids 223 are rotated into, through, and out of the ring. When a solenoid inductor resides within the ring it has a large inductance value compared with its inductance value when outside the ring. This lower inductance region occurs in the vicinity of the stator solenoids 217. The variable inductance solenoids can be used for gating the thyristors, in place of the coils 117, of the previously described embodiment. This is particularly true if superconducting wires are used for the inductors 223. In the low inductance region, i.e. the area outside the ring, currents exceeding the superconductor's critical currents are drawn. Current then should flow in a stabilizer having a high resistivity, for example, a copper nickel alloy stabilizer.

The variable inductance feature of BMH motor 203 reduces commutation losses. This is accomplished by having the switches open when the inductors are within the ring. At that time, lower currents will be flowing, switching losses will be lower, and high efficiencies can be obtained.

In view of the above, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

We claim:

1. A brushless, homopolar electric motor comprising:
    rotor means including at least one rotor winding having a plurality of turns, and a rotor assembly on each end of which is installed a distribution disk, respective ends of the rotor winding being connected to one of the disks;
    flux pumping means for inductively charging the rotor winding and including rectifier means comprising a half-wave rectifier for supplying an electrical current to the rotor winding, the rotor means further including means for electrically interconnecting the respective ends of the rotor winding with the half-wave rectifier for the disks to be electrically connected across an electrical output of the half-wave rectifier; and,
    switch means for controlling operation of the flux pumping means.

2. The motor of claim 1 further including means for compensating for winding losses and losses in the electrical leads through which the rotor means and the flux pumping means are electrically interconnected.

3. The motor of claim 2 wherein the compensating means comprises a plurality of electrical solenoids acting as field windings, input power to the solenoids compensating for the winding and field losses whereby no power is supplied to the dynamoelectric machine through the solenoids.

4. The motor of claim 3 wherein the solenoids are arranged in pairs about the rotor means.

5. A brushless, homopolar electric motor comprising:
    rotor means including at least one rotor winding having a plurality of turns;
    flux pumping means for inductively charging the rotor winding; and,
    switch means for controlling operation of the flux pumping means and including a solid state switching device connected in the rotor winding and means for gating the solid state switching device into conduction, the solid state switching device comprising a thyristor and the gating means including a coil overlying the rotor winding and electrically insulated from the rotor winding, a voltage developed by the coil being impressed on a gate input of the thyristor to switch it into conduction.

6. The motor of claim 5 having a plurality of rotor windings each of which has an associated switch means including a thyristor and coil, the thyristors being sequentially gated into conduction as back emf complements a voltage applied to the winding.

7. The motor of claim 5 wherein the gating means comprises a variable inductance coil.

8. The motor of claim 7 wherein the variable inductance switch includes a plurality of solenoid inductors, one for each rotor winding, and means for rotating the solenoid inductors as a rotatable shaft of the motor rotates.

9. The motor of claim 8 wherein the switch means includes a housing through which the solenoid inductors are rotatable, a portion of the path through which the solenoid inductors are rotated extending through the housing, the inductors having a larger inductance value when inside the housing than outside thereof so to effect gating of the thyristors.

10. The motor of claim 9 wherein the housing has a half-ring shape.

* * * * *